(12) United States Patent
Chun-Lung

(10) Patent No.: US 6,623,305 B2
(45) Date of Patent: Sep. 23, 2003

(54) DUAL SIM (SUBSCRIBER INDENTITY MODULE) CARD CONNECTOR

(75) Inventor: Chen Chun-Lung, Taipei (TW)

(73) Assignee: Quanta Computer, Inc., Taoyuan (TW)

( * ) Notice: Subject to any disclaimer, the term of this patent is extended or adjusted under 35 U.S.C. 154(b) by 0 days.

(21) Appl. No.: 10/141,957

(22) Filed: May 10, 2002

(65) Prior Publication Data
US 2002/0168900 A1 Nov. 14, 2002

(30) Foreign Application Priority Data
May 11, 2001 (TW) ........................................ 90207781 A

(51) Int. Cl.⁷ .............................................. H01R 12/00
(52) U.S. Cl. ...................................... 439/630; 439/108
(58) Field of Search ................................ 439/630, 108, 439/101, 64, 74; 235/441

(56) References Cited

U.S. PATENT DOCUMENTS

| 5,746,607 | A | * | 5/1998 | Bricaud et al. | 439/630 |
| 5,967,845 | A | * | 10/1999 | Ho et al. | 439/64 |
| 6,250,965 | B1 | * | 6/2001 | Neifer | 439/630 |
| 6,305,960 | B1 | * | 10/2001 | Fan | 439/630 |

* cited by examiner

Primary Examiner—Gary Paumen
(74) Attorney, Agent, or Firm—Rabin & Berdo, P.C.

(57) ABSTRACT

A dual SIM card connector for holding a first SIM card and a second SIM card and installing in a cellular phone is disclosed. The dual SIM card comprises a housing and an inter-layer. The inter-layer is inside the housing. Between the inter-layer and the housing, there forms a first slot and a second slot. The inter-layer comprises: a common recess on the first surface of the inter-layer, wherein the common recess has a through hole. A common GND contact spring leaf is mounted in the common recess and electrically coupled to both the first SIM card and the second SIM card through the through hole.

20 Claims, 6 Drawing Sheets

DUAL SIM (SUBSCRIBER INDENTITY MODULE) CARD CONNECTOR

This application incorporates by reference of Taiwan application Serial No. 090207781, filed May 11, 2001.

BACKGROUND OF THE INVENTION

1. Field of the Invention

The invention relates in general to a SIM card connector for installing in a cellular phone, and more particularly to a dual SIM card connector for installing in a cellular phone.

2. Description of the Related Art

As is well-known, chip or smart cards are used for various purposes, for instance as prepaid telephone cards. Such a telephone card allows the purchaser to insert the card into a public telephone and then make telephone calls equivalent to the amount of money paid for said telephone card. Chip cards are also used to identify members of, for instance, a health organization and so on. SIM cards derive their name form the words "subscriber identity module". SIM cards are frequently used in so-called cell phones, for instance to identify a subscriber of the respective telephone company.

For miniaturization, particularly in the field of mobile telephones, it is an object of the present invention to make a contacting device for a SIM card as small as possible. Of particular importance is a small thickness or height of the contacting device. Preferably, a contacting device should be barely larger than the SIM card itself. Furthermore, the contacting device should be of simple construction and easy to operate. Misalignment or wrong orientation of the SIM card should be avoided.

Referring to FIG. 1, a conventional SIM card connector is shown. The conventional SIM card connector 100 includes a connecting base 102, clips 104a, 104b, 104c and 104d. The clips 104a and 104b are positioned at the left side of the top surface 106 of the connecting base 102 and the clips 104c and 104d are positioned at the right side of the top surface 106 of the connecting base 102. The connecting base 102 typically includes 6 recesses 110 and 6 contact points 112. Each of the contact points 112 is positioned at each corresponding recesses 110. The contact points 112 are electrically coupled to the six exposing points 114 of the SIM card 108. The recesses typically include a VCC (supply voltage) recess, a RST (reset) recess, a CLK (Clock Signal) recess, an I/O (Data Input/Output) recess, a GND (Ground) recess and a VPP (Programming Voltage) recess. Correspondingly, the contact points 112 include a VCC contact point, a RST contact point, a CLK contact point, an I/O contact point, a GND contact point and a VPP contact point.

The VCC contact point, the RST contact point, the CLK contact point, the I/O contact point, the GND contact point and the VPP contact point are respectively positioned at the VCC recess, the RST recess, the CLK recess, the I/O recess, the GND recess and the VPP recess. The exposing points 114 of the SIM card 108 include a VCC exposing point, a RST exposing point, a CLK exposing point, an I/O exposing point, a GND exposing point, and a VPP exposing point. Referring to FIG. 1, while the SIM card 108 is inserted into the SIM card connector 100 along the arrow 150, the exposing points 114 of the SIM card 108 are electrically coupled to the contact points 112 of the connecting base 102 and the clips 104a, 104b, 104c, and 104d latch the two sides of the SIM card 108 and firmly attach the SIM card 108 on the SIM card connector 100. The contact points 112 extend from the SIM card connector 100 and are electrically coupled to the PCB (Printed Circuit Board) of the cellular phone.

The conventional single SIM card connector as shown in FIG. 1 further includes 6 contact spring leaves (not shown). For people use more than two SIM cards, a single SIM card connector can be damaged by the frequent changes of SIM cards. Thus, a dual SIM card connector is developed. The conventional dual SIM card connector lays the two SIM card connecting bases parallel to each other and thus requires 12 contact spring leaves.

SUMMARY OF THE INVENTION

It is therefore an object of the invention to provide a dual SIM card connector with common contact spring leaves, which is more cost-effective and minimized.

According to a preferred embodiment of the invention, a dual SIM (Subscriber Identity Module) card connector for holding a first SIM card and a second SIM card, is disclosed. The dual SIM card connector includes a housing and an inter-layer. The inter-layer is inside the housing, wherein the inter-layer comprises a first surface and a second surface, which are opposite to each other, and wherein between the first surface of the inter-layer and the housing, there forms a first slot for inserting a first SIM card and between the second surface of the inter-layer and the housing, there forms a second slot for inserting a second SIM card. The inter-layer comprises a common recess, a plurality of first recesses, a plurality of second recesses, a common contact spring leaf, a plurality of first contact spring leaves, and a plurality of second contact spring leaves. The common recess is on the first surface of the inter-layer and has a through hole. The first recesses are on the first surface of the inter-layer. The second recesses are on the second surface of the inter-layer. The common contact spring leaf is mounted in the common recess and electrically coupled to both the first SIM card and the second SIM card through the through hole. The first contact spring leaves are mounted in the first recesses and electrically coupled to the first SIM card. The second contact spring leaves are mounted in the second recesses and electrically coupled to the second SIM card.

A dual SIM card connector for holding a first SIM card and a second SIM card and installing in a cellular phone is disclosed. The dual SIM card comprises a housing and an inter-layer. The inter-layer is inside the housing. The inter-layer comprises a first surface and a second surface, which are opposite to each other. Between the first surface of the inter-layer and the housing, there forms a first slot for inserting a first SIM card and between the second surface of the inter-layer and the housing, there forms a second slot for inserting a second SIM card. The inter-layer comprises: a common recess on the first surface of the inter-layer, wherein the common recess has a through hole; a plurality of first recesses on the first surface of the inter-layer; a plurality of second recesses on the second surface of the inter-layer; a common GND contact spring leaf mounted in the common recess and electrically coupled to both the first SIM card and the second SIM card through the through hole; a plurality of first contact spring leaves mounted in the first recesses and electrically coupled to the first SIM card; a plurality of second contact spring leaves mounted in the second recesses and electrically coupled to the second SIM card; and an indentation facilitating pushing out the first SIM card and the second SIM card.

Other objects, features, and advantages of the invention will become apparent from the following detailed description of the preferred but non-limiting embodiments. The following description is made with reference to the accompanying drawings.

DETAILED DESCRIPTION OF THE INVENTION

According to the spirit of the invention, a dual SIM (Subscriber Identity Module) card connector for installing in a cellular phone is disclosed. By the dual SIM card connector of the invention, the frequency of drawing out the SIM card is reduced, the chance of damaging the SIM card and the SIM card connector is also eliminated.

Figure 1:
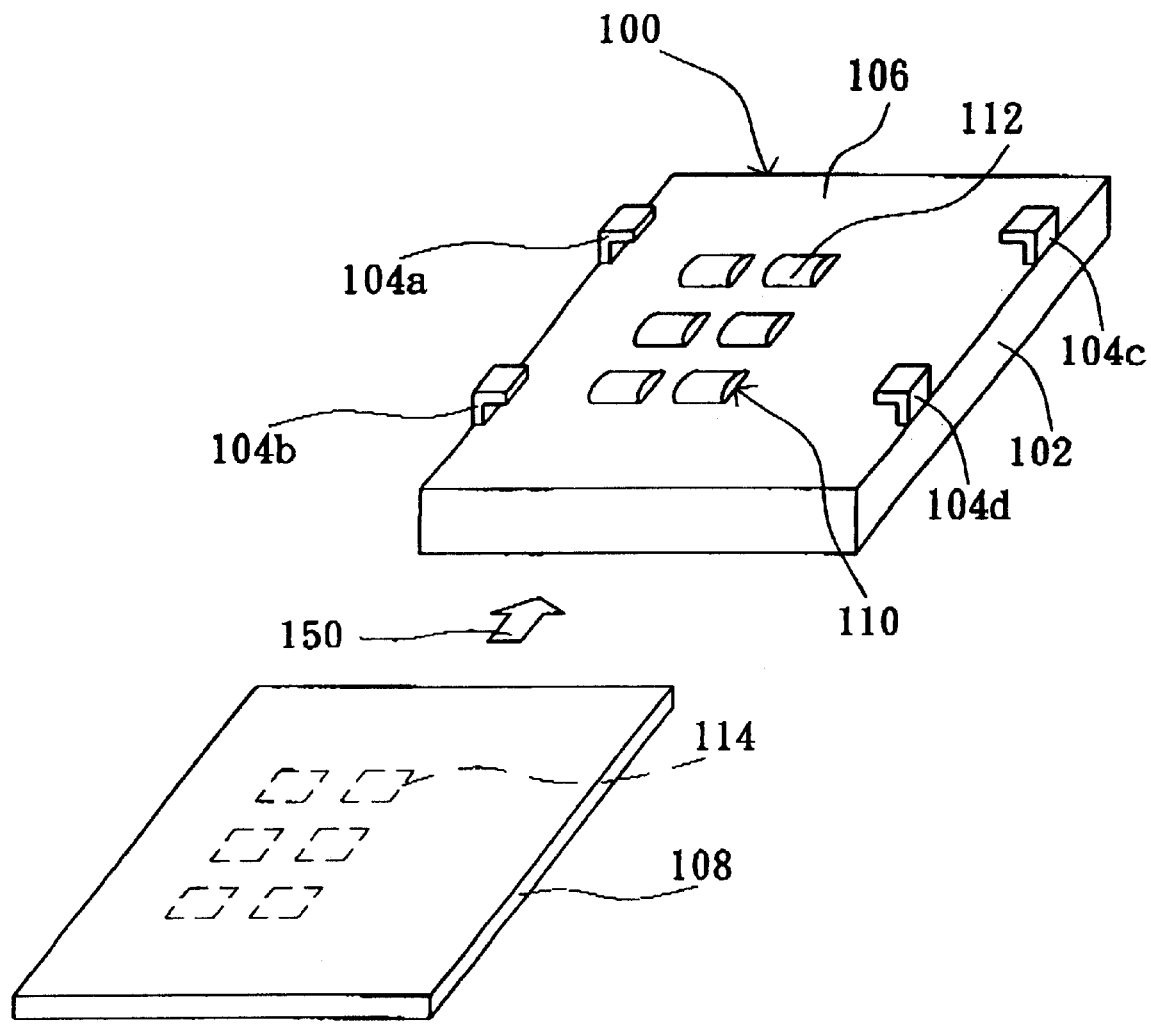
FIG. 1 shows a conventional SIM card connector.
Figure 2:
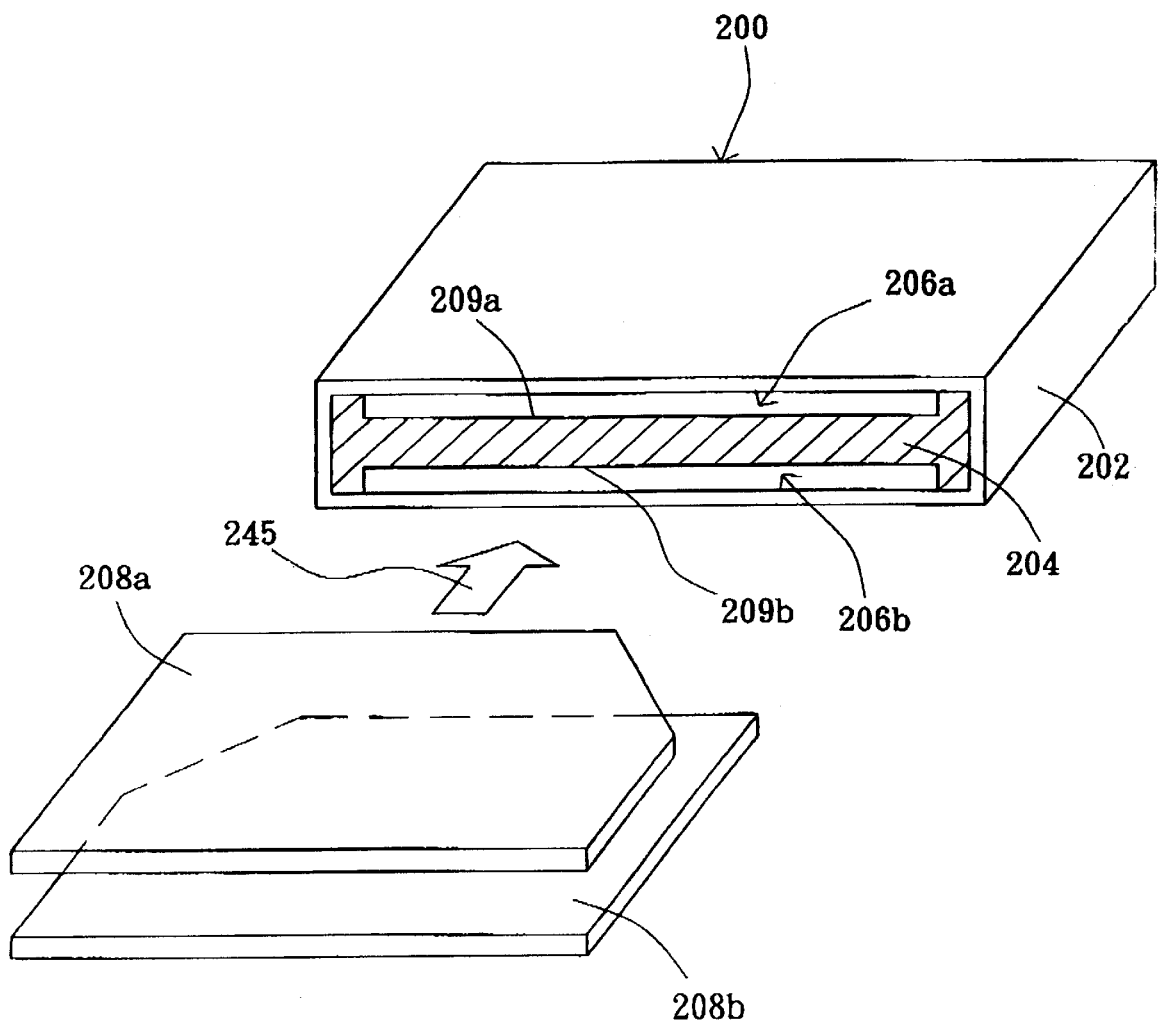
FIG. 2, a prospective 3-dimentional view of the dual SIM card connector of the invention is illustrated.

Referring to FIG. 2, a prospective 3-dimentional view of the dual SIM card connector of the invention is illustrated. The dual SIM card connector 200 comprises a housing 202 and an inter-layer 204. The inter-layer 204 is inside the housing 202 and divides the interior of the housing 202 into two slots 206a and 206b. The SIM card 208a and SIM card 208b insert into the slots 206a and 206b along the arrow 245. The inter-layer 204 comprises two opposite surfaces 209a and 209b and the inter-layer 204 and the housing 202 are preferably unitary.

Figure 3A:
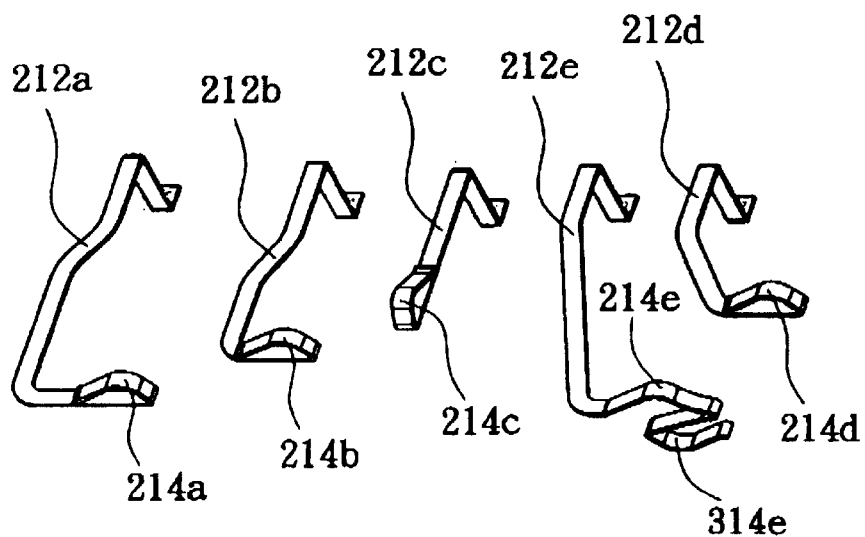
FIG. 3A, the elements on the surface 209a of the inter-layer 204 are shown in detail.
Figure 3A:
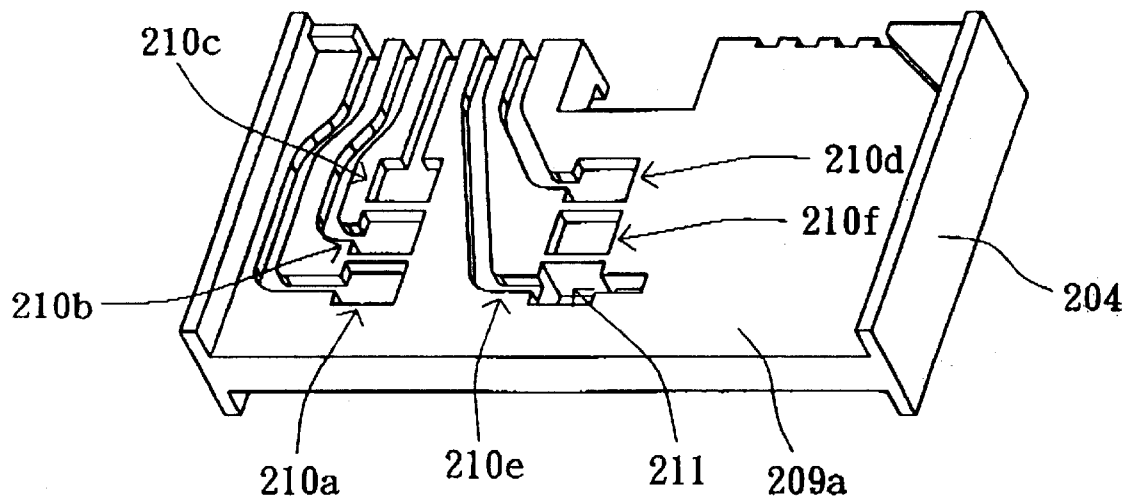
Figure 3B:
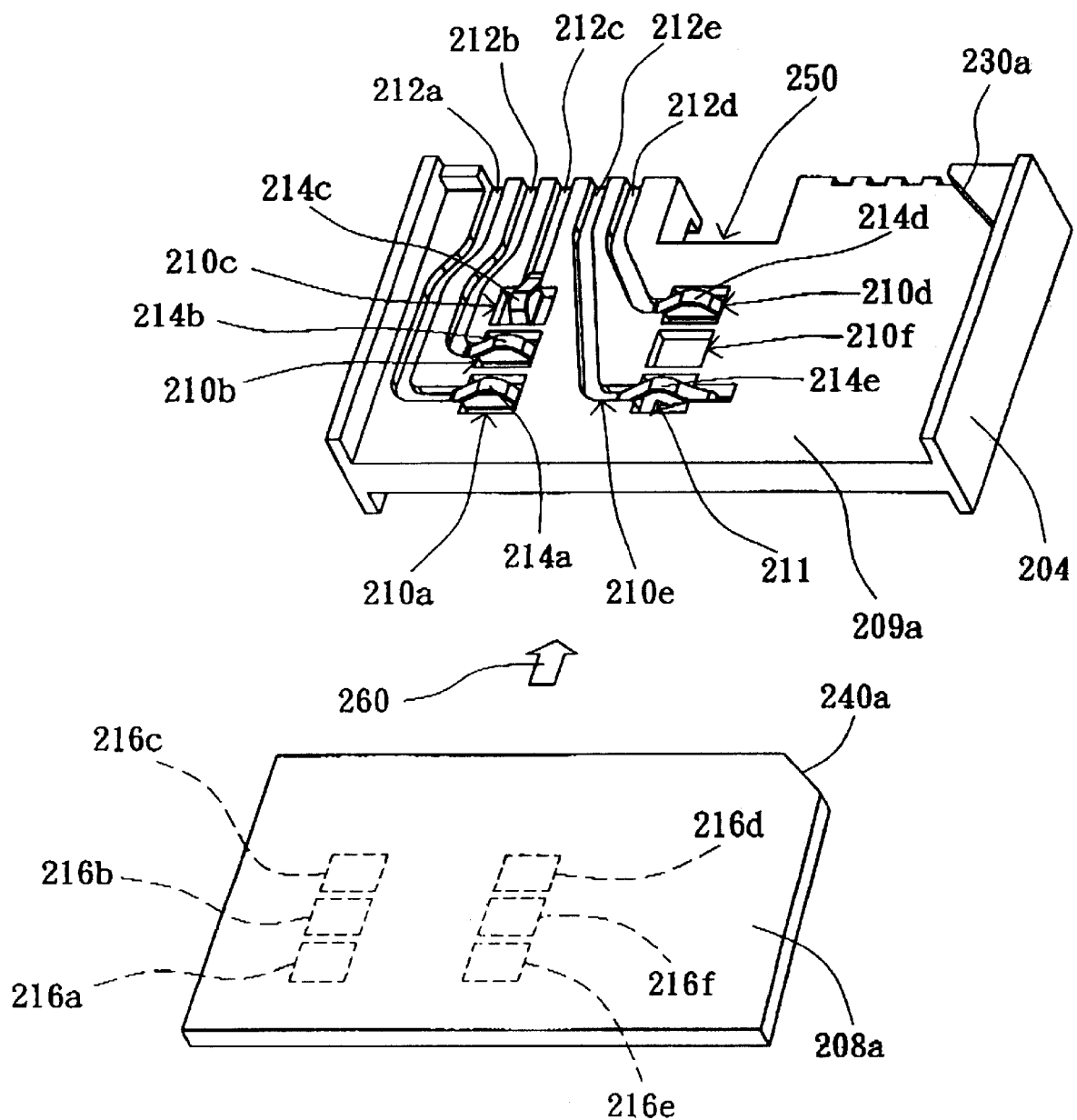
FIG. 3B shows the positions of the contact spring leaves on the recesses.

Referring to FIG. 3A, the elements on the surface 209a of the inter-layer 204 are shown in detail. As shown in FIG. 3A, on the surface 209a of the inter-layer 204, there are a common recess, a common contact spring leaf, a number of individual recesses and individual spring leaves. The common contact spring leaf and the individual spring leaves are used to be electrically connected to the SIM card 208a, as shown in FIG. 2. The common recess can be a GND (Ground) recess 210e and the common contact spring leaf can be a GND contact spring leaf 212e. At one end of the GND recess 210e, there is a through hole 211 penetrating the inter-layer 204. These recesses include a VCC (supply voltage) recess 210a, a RST (reset) recess 210b, a CLK (clock signal) recess 210c, an I/O (Data Input/Output) recess 210d and a spare recess 210f. The contact spring leaves include a VCC contact spring leaf 212a, a RST contact spring leaf 212b, a CLK contact spring leaf 212c and an I/O contact spring leaf 212d. The VCC contact spring leaf 212a, the RST contact spring leaf 212b, the CLK contact spring leaf 212c and the I/O contact spring leaf 212d respectively have a VCC contact point 214a, a RST contact point 214b, a CLK contact point 214c and an I/O contact point 214d. The VCC contact spring leaf 212a, the RST contact spring leaf 212b, the CLK contact spring leaf 212c and the I/O contact spring leaf 212d and the GND contact spring leaf 212e are positioned at the VCC recess 210a, the RST recess 210b, the CLK recess 210c, the I/O recess 210d and the GND recess 210e, respectively, as shown in FIG. 3B. According to a preferred embodiment of the invention, the GND contact spring leaf 212e is designed as a common contact spring leaf with a contact point 214e and a contact point 314e at the through hole 211 in the GND recess 210e. The contact point 214e and the contact point 314e are electrically coupled to the SIM card 208a and the SIM card 208b, respectively.

In FIG. 3B, the SIM card 208a include a VCC exposing contact 216a, a RST exposing contact 216b, a CLK exposing contact 216c, an I/O exposing contact 216d, a GND exposing contact 216e and a spare exposing contact 216f. While the SIM card 208a is inserted into the slot 206a along the arrow 260, the VCC exposing contact 216a, the RST exposing contact 216b, the CLK exposing contact 216c, the I/O exposing contact 216d, and the GND exposing contact 216e of the SIM card 208a are electrically coupled to the VCC contact point 214a, the RST contact point 214b, the CLK contact point 214c, the I/O contact point 214d and the GND contact point 214e.

The SIM card 208a comprises a SIM card beveled edge 240a complementary to the extension 230a of the surface 209a. The SIM card beveled edge 240a prevents itself from malposition. The inter-layer 204 further comprises an indentation 250 which facilitates pushing out the SIM card 208a from the slot 206a.

Figure 4A:
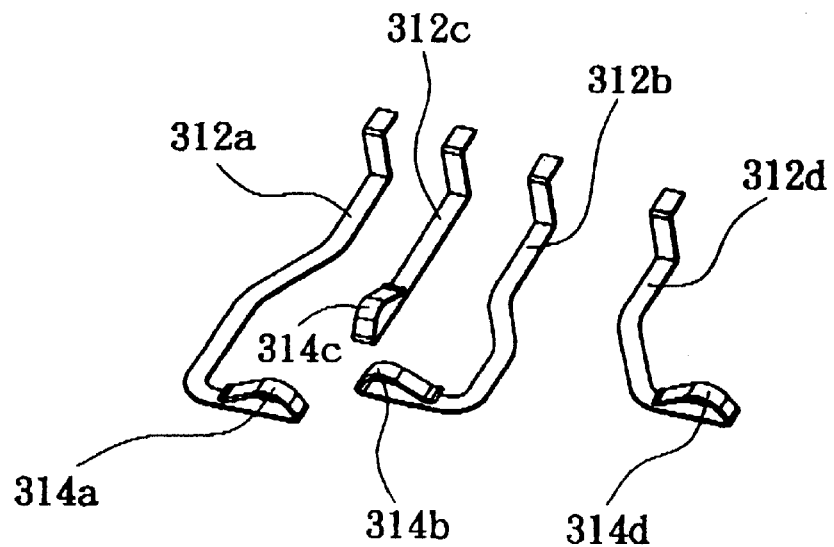
FIG. 4A, the elements on the surface 209b of the inter-layer 204 are shown in detail.
Figure 4A:
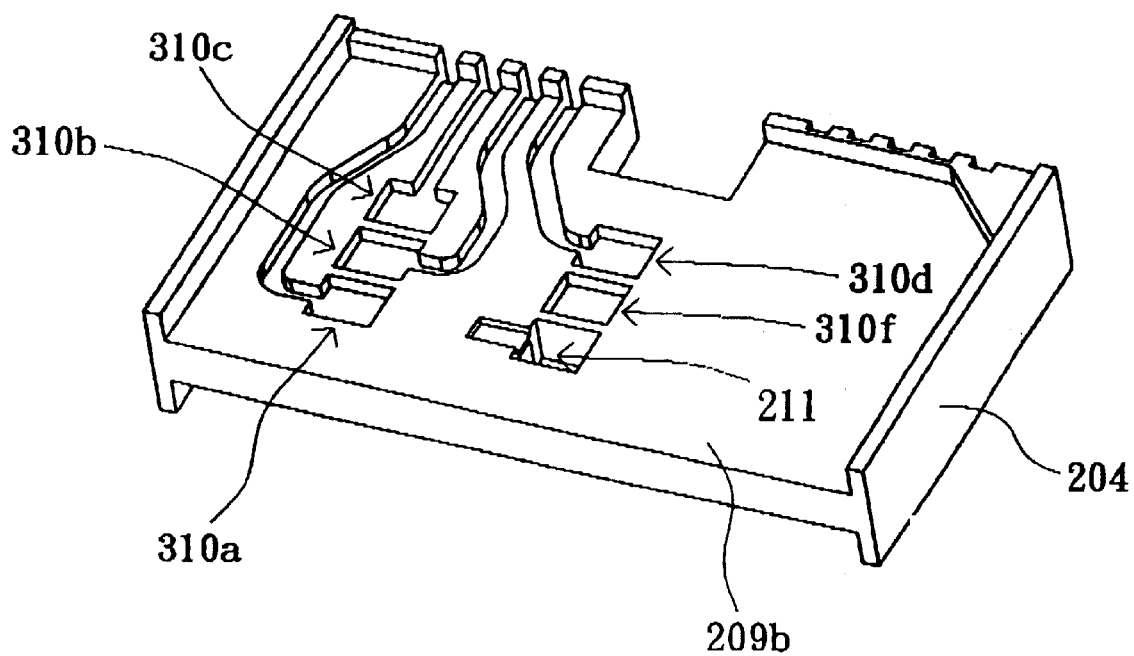
Figure 4B:
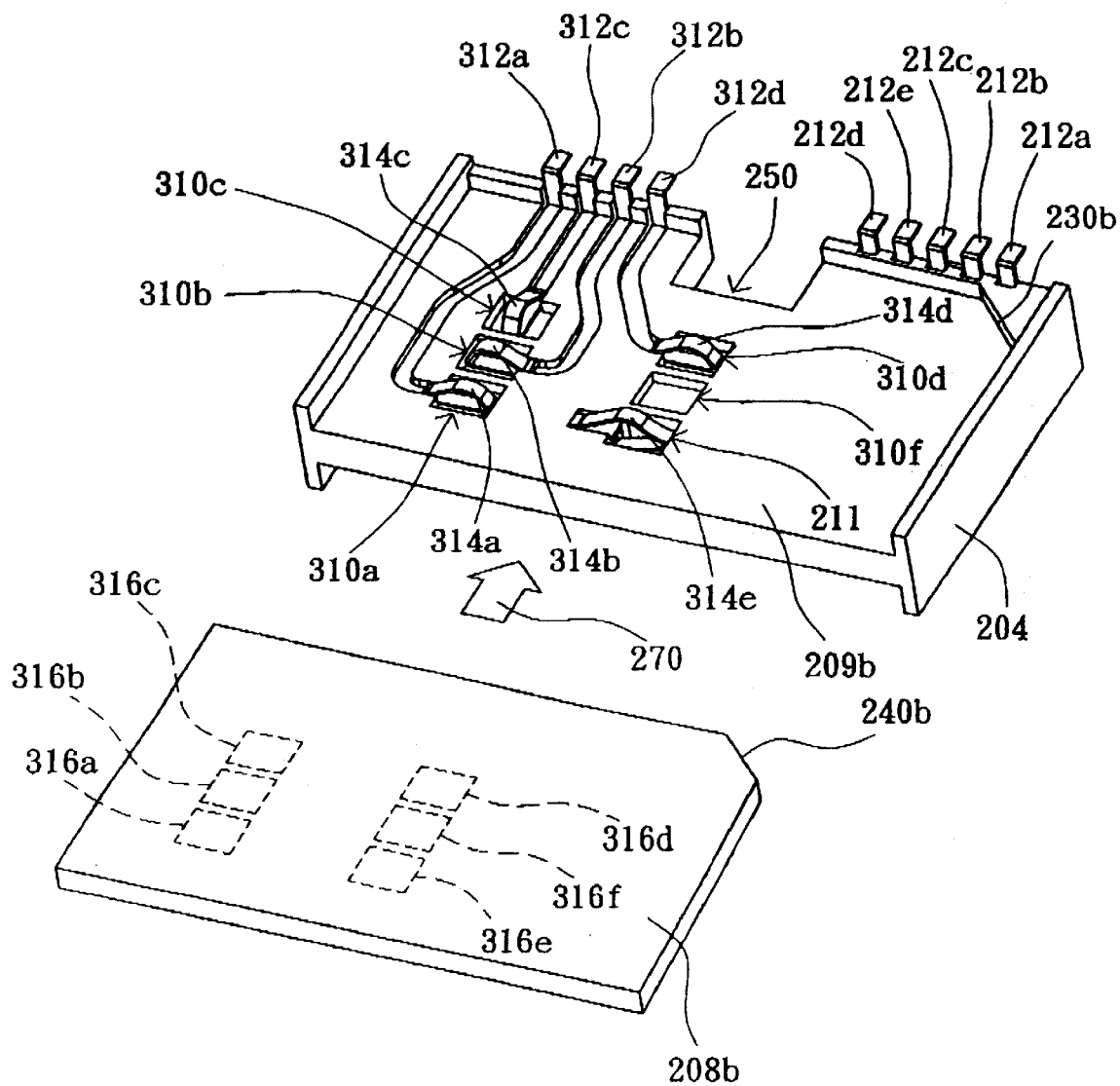
FIG. 4B shows the positions of the contact spring leaves on the recesses.

Referring to FIG. 4A, the elements on the surface 209b of the inter-layer 204 are shown in detail. As shown in FIG. 4A, on the surface 209b of the inter-layer 204, there are a number of individual recesses and individual spring leaves. The common contact spring leaf and the individual spring leaves are used to be electrically connected to the SIM card 208b, as shown in FIG. 2. These recesses include a VCC recess 310a, a RST recess 310b, a CLK recess 310c, an I/O recess 310d and a spare recess 310f. The contact spring leaves include a VCC contact spring leaf 312a, a RST contact spring leaf 312b, a CLK contact spring leaf 312c and an I/O contact spring leaf 312d. The VCC contact spring leaf 312a, the RST contact spring leaf 312b, the CLK contact spring leaf 312c and the I/O contact spring leaf 312d respectively have a VCC contact point 314a, a RST contact point 314b, a CLK contact point 314c and an I/O contact point 314d. The VCC contact spring leaf 312a, the RST contact spring leaf 312b, the CLK contact spring leaf 312c and the I/O contact spring leaf 312d are positioned at the VCC recess 310a, the RST recess 310b, the CLK recess 310c, and the I/O recess 310d, respectively, as shown in FIG. 4B. According to a preferred embodiment of the invention, the GND contact spring leaf 212e penetrates the through hole 211 and exposes a GND contact point 314e at the surface 209b. So the GND contact spring leaf 212e is used by both the SIM card 208a and the SIM card 208b. Compared to the conventional dual SIM card connector, less number of the GND contact spring leaf is used and consequently the manufacturing process is simplified and the cost is reduced.

In FIG. 4B, the SIM card 208b includes a VCC exposing contact 316a, a RST exposing contact 316b, a CLK exposing contact 316c, an I/O exposing contact 316d, a GND exposing contact 316e and a spare exposing contact 316f. While the SIM card 208b is inserted into the slot 206b along the arrow 270, the VCC exposing contact 316a, the RST exposing contact 316b, the CLK exposing contact 316c, the I/O exposing contact 316d, and the GND exposing contact 316e of the SIM card 208b are electrically coupled to the VCC contact point 314a, the RST contact point 314b, the CLK contact point 314c, the I/O contact point 314d and the GND contact point 314e.

The VCC contact spring leaf 212a, the VCC contact spring leaf 312a, the RST contact spring leaf 212b, the RST contact spring leaf 312b, the CLK contact spring leaf 212c, the CLK contact spring leaf 312c, the I/O contact spring leaf 212d, the I/O contact spring leaf 312d, and the GND contact spring leaf 212e are electrically coupled to the PCB (Printed Circuit Board) of a dual SIM card cellular phone.

The SIM card 208b comprises a SIM card beveled edge 240b complementary to the extension 230b of the surface 209b. The SIM card beveled edge 240b prevents itself from malposition. The inter-layer 204 further comprises an indentation 250 which facilitates pushing out the SIM card 208b from the slot 206b.

The dual SIM card connector 200 can be positioned with 2 SIM cards, having 9 contact spring leaves. Compared with the conventional one, less contact spring leaves are needed, which contributes reducing the cost. By the inter-layer inside the housing of the invention, one of the SIM cards can be arranged on the top of the other so that the overall size of the SIM card connector is reduced.

While the invention has been described by way of example and in terms of a preferred embodiment, it is to be understood that the invention is not limited thereto. Other modifications such as changing the direction of inserting the SIM cards, the shape of the contact points into spherical surface and cross-like shape or simplifying the housing are also within the scope of the invention.

By the dual SIM card connector of the invention, the frequency of drawing out the SIM card is reduced, and the chance of damaging the SIM card and the SIM card connector is also eliminated. Also the dual SIM card connector includes common contact spring leaves, which is more cost-effective and has minimized size.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A dual SIM (Subscriber Identity Module) card connector for holding a first SIM card and a second SIM card, comprising:
    a housing; and
    an inter-layer inside the housing, wherein the inter-layer comprises a first surface and a second surface, which are opposite to each other, and wherein between the first surface of the inter-layer and the housing, there forms a first slot for inserting the first SIM card and between the second surface of the inter-layer and the housing, there forms a second slot for inserting the second SIM card, wherein the inter-layer comprises:
        a common recess on the first surface of the inter-layer, wherein the common recess has a through hole;
        a common contact spring leaf mounted in the common recess and electrically coupled to both the first SIM card and the second SIM card through the through hole;
        a plurality of first contact spring leaves mounted on the first surface of the inter-layer and electrically coupled to the first SIM card; and
        a plurality of second contact spring leaves mounted on the second surface of the inter-layer and electrically coupled to the second SIM card.

2. The dual SIM card connector as claimed in claim 1, wherein the common contact spring leaf is a GND (ground) spring leaf.

3. The dual SIM card connector as claimed in claim 2, wherein the GND spring leaf comprises a first GND contact point and a second GND contact point at the through hole, wherein the first GND contact point and the second GND contact point are coupled to a first exposing contact of the first SIM card and a second exposing contact of the second SIM card, respectively.

4. The dual SIM card connector as claimed in claim 1, wherein the first recesses comprise a first VCC (supply voltage) recess, a first RST (reset) recess, a first CLK (clock signal) recess and a first I/O (data input/output) recess.

5. The dual SIM card connector as claimed in claim 4, wherein the first contact spring leaves comprise a first VCC contact spring leaf, a first RST contact spring leaf, a first CLK contact spring leaf, and a first I/O contact spring leaf mounted at the first VCC recess, the first RST recess, the first CLK recess and the first I/O recess, respectively.

6. The dual SIM card connector as claimed in claim 5, wherein the first VCC contact spring leaf comprises a first VCC contact point for electrically coupling to a first VCC exposing contact of the first SIM card.

7. The dual SIM card connector as claimed in claim 5, wherein the first RST contact spring leaf comprises a first RST contact point for electrically coupling to a first RST exposing contact of the first SIM card.

8. The dual SIM card connector as claimed in claim 5, wherein the first CLK contact spring leaf comprises a first CLK contact point for electrically coupling to a first CLK exposing contact of the first SIM card.

9. The dual SIM card connector as claimed in claim 5, wherein the first I/O contact spring leaf comprises a first I/O contact point for electrically coupling to a first I/O exposing contact of the first SIM card.

10. The dual SIM card connector as claimed in claim 1, wherein the second recesses comprise a second VCC recess, a second RST recess, a second CLK recess and a second I/O recess.

11. The dual SIM card connector as claimed in claim 10, wherein the second contact spring leaves comprise a second VCC contact spring leaf, a second RST contact spring leaf, a second CLK contact spring leaf, and a second I/O contact spring leaf mounted at the second VCC recess, the second RST recess, the second CLK recess and the second I/O recess, respectively.

12. The dual SIM card connector as claimed in claim 11, wherein the second VCC contact spring leaf comprises a second VCC contact point for electrically coupling to a second VCC exposing contact of the second SIM card.

13. The dual SIM card connector as claimed in claim 11, wherein the second RST contact spring leaf comprises a second RST contact point for electrically coupling to a second RST exposing contact of the second SIM card.

14. The dual SIM card connector as claimed in claim 11, wherein the second CLK contact spring leaf comprises a second CLK contact point for electrically coupling to a second CLK exposing contact of the second SIM card.

15. The dual SIM card connector as claimed in claim 11, wherein the second I/O contact spring leaf comprises a second I/O contact point for electrically coupling to a second I/O exposing contact of the second SIM card.

16. The dual SIM card connector as claimed in claim 1, wherein the housing and the inter-layer are unitary.

17. The dual SIM card connector as claimed in claim 1, wherein the inter-layer further comprises an indentation facilitating pushing out the first SIM card and the second SIM card.

18. A dual SIM card connector for holding a first SIM card and a second SIM card and installing in a cellular phone, comprising:
    a housing; and
    an inter-layer inside the housing, wherein the inter-layer comprises a first surface and a second surface, which are opposite to each other, and wherein between the first surface of the inter-layer and the housing, there forms a first slot for inserting the first SIM card and between the second surface of the inter-layer and the housing, there forms a second slot for inserting the second SIM card, wherein the inter-layer comprises:
- a common recess on the first surface of the inter-layer, wherein the common recess has a through hole;
- a plurality of first recesses on the first surface of the inter-layer;
- a plurality of second recesses on the second surface of the inter-layer;
- a common GND contact spring leaf mounted in the common recess and electrically coupled to both the first SIM card and the second SIM card through the through hole;
- a plurality of first contact spring leaves mounted in the first recesses and electrically coupled to the first SIM card; and
- a plurality of second contact spring leaves mounted in the second recesses and electrically coupled to the second SIM card.

19. A dual SIM card connector for holding a first SIM card and a second SIM card and installing in a cellular phone, at least comprising:
- an inter-layer inside the dual SIM card connector, wherein the inter-layer comprises:
  - a through hole penetrating the inter-layer;
  - a common contact spring leaf at a surface of the inter-layer, wherein the common contact spring leaf is electrically coupled to the first SIM card and the second SIM card at the through hole;
  - a plurality of first contact spring leaves at said surface of the inter-layer, wherein the first contact spring leaves are electrically coupled to the first SIM card; and
  - a plurality of second contact spring leaves at an opposite surface of said surface, wherein the second contact spring leaves are electrically coupled to the second SIM card.

20. A dual SIM card connector for holding a first SIM card and a second SIM card and installing in a cellular phone, at least comprising:
- an inter-layer inside the dual SIM card connector, wherein the inter-layer comprises:
  - a through hole penetrating the inter-layer;
  - a common contact spring leaf at a surface of the inter-layer, wherein the common contact spring leaf is electrically coupled to the first SIM card and the second SIM card at the through hole;
  - a plurality of first contact spring leaves at said surface of the inter-layer, wherein the first contact spring leaves are electrically coupled to the first SIM card; and
  - a plurality of second contact spring leaves at an opposite surface of said surface, wherein the second contact spring leaves are electrically coupled to the second SIM card.

* * * * *